(12) United States Patent
Hart et al.

(10) Patent No.: US 12,420,803 B2
(45) Date of Patent: Sep. 23, 2025

(54) POTHOLE AND ROAD CONDITION CLASSICATION USING HUMAN DRIVEN TELEMETRY

(71) Applicant: GM GLOBAL TECHNOLOGY OPERATIONS LLC, Detroit, MI (US)

(72) Inventors: Nathaniel W Hart, Beverly Hills, MI (US); Adam L Wright, Livonia, MI (US); David A Craig, Owasso, OK (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 297 days.

(21) Appl. No.: 18/313,244

(22) Filed: May 5, 2023

(65) Prior Publication Data

US 2024/0367657 A1 Nov. 7, 2024

(51) Int. Cl.
| | |
|---|---|
| *B60W 40/06* | (2012.01) |
| *B60W 10/20* | (2006.01) |
| *B60W 10/22* | (2006.01) |
| *B60W 60/00* | (2020.01) |
| *G06V 20/56* | (2022.01) |

(52) U.S. Cl.
CPC ............ *B60W 40/06* (2013.01); *B60W 10/20* (2013.01); *B60W 10/22* (2013.01); *B60W 60/001* (2020.02); *G06V 20/588* (2022.01); *B60W 2540/18* (2013.01); *B60W 2552/35* (2020.02); *B60W 2556/40* (2020.02)

(58) Field of Classification Search
CPC ...... B60W 10/20; B60W 10/22; B60W 40/06; B60W 60/001; B60W 2552/35; B60W 2556/40; B60W 2540/18; G06V 20/588

USPC .......................................................... 701/23
See application file for complete search history.

(56) References Cited

U.S. PATENT DOCUMENTS

| | | | |
|---|---|---|---|
| 10,852,746 B2 * | 12/2020 | Silver | B60W 10/04 |
| 2015/0224845 A1 * | 8/2015 | Anderson | B60G 17/052 |
| | | | 701/37 |
| 2017/0285646 A1 * | 10/2017 | Connor | B60W 10/184 |
| 2019/0347821 A1 * | 11/2019 | Stein | G08G 1/096725 |
| 2020/0238999 A1 * | 7/2020 | Batts | B60W 30/09 |
| 2020/0339157 A1 * | 10/2020 | Yurdana | B60K 35/22 |
| 2020/0384980 A1 * | 12/2020 | Yu | G05D 1/0088 |
| 2021/0061282 A1 * | 3/2021 | Jafari Tafti | G05D 1/0088 |
| 2021/0197806 A1 * | 7/2021 | Newman | B60W 10/184 |

(Continued)

FOREIGN PATENT DOCUMENTS

| | | | | |
|---|---|---|---|---|
| WO | WO-2020159961 A1 * | 8/2020 | | G05B 13/0265 |
| WO | WO-2022016044 A1 * | 1/2022 | | B60Q 1/08 |
| WO | WO-2023129648 A2 * | 7/2023 | | G01C 21/3461 |

*Primary Examiner* — Atul Trivedi
(74) *Attorney, Agent, or Firm* — Ingrassia Fisher & Lorenz, LLP | IF&L

(57) ABSTRACT

Methods and systems are provided for road condition classification that include one or more sensors configured to obtain sensor data pertaining to operation of a vehicle along a roadway by a human; and one or more processors that are coupled to the one or more sensors and that are configured to at least facilitate analyzing the sensor data as to one or more threshold values pertaining to the operation of the vehicle; and identifying one or more conditions of the roadway, based on the analyzing of the sensor data. Further, learned input is provided to the vehicle control system to operate with lane position behavior similar to a human driven vehicle.

20 Claims, 2 Drawing Sheets

(56) References Cited

U.S. PATENT DOCUMENTS

| | | | | |
|---|---|---|---|---|
| 2021/0349459 A1* | 11/2021 | Huang | ................... | G06F 3/011 |
| 2022/0009501 A1* | 1/2022 | Guan | ................... | B60W 40/06 |
| 2022/0082403 A1* | 3/2022 | Shapira | ................. | G06V 20/58 |
| 2022/0250624 A1* | 8/2022 | Park | .......................... | G06T 7/30 |
| 2022/0379679 A1* | 12/2022 | Eisenmann | ........ | B60G 17/0165 |
| 2023/0258457 A1* | 8/2023 | Jiang | ................... | G08G 1/0141 |
| | | | | 701/446 |
| 2024/0247944 A1* | 7/2024 | Barrera | .............. | G01C 21/3602 |
| 2024/0308534 A1* | 9/2024 | Sharma | ............... | G06V 20/588 |

* cited by examiner

POTHOLE AND ROAD CONDITION CLASSICATION USING HUMAN DRIVEN TELEMETRY

TECHNICAL FIELD

The technical field generally relates to vehicles and, more specifically, to systems and methods for utilizing telemetry from human driving of vehicles for classification of potholes and other road conditions, including for use in autonomous driving.

BACKGROUND

Certain vehicles today have automated features that provide for automated driving and/or assistance for a driver of the vehicle. These features may include, for example, automated steering, automated braking, and other automated features and variations thereof. However, existing techniques may not always be optimal, for example with respect to potholes or other road conditions that may change from time to time.

Accordingly, it is desirable to provide improved methods and systems for classification of potholes and other road conditions, including for controlling automated features of a vehicle. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a method is provided that includes obtaining sensor data pertaining to operation of a vehicle along a roadway by a human, from one or more sensors of the vehicle; analyzing the sensor data, via one or more processors, as to one or more threshold values pertaining to the operation of the vehicle; and identifying one or more conditions of the roadway, via the one or more processors, based on the analyzing of the sensor data.

Also in an exemplary embodiment, the method further includes updating a map database for the roadway that is stored in a computer memory, generating an updated map database in the computer memory, based on the identifying of the one or more conditions; and utilizing the updated map database for subsequent autonomous control of the vehicle, one or more other vehicles, or both, in accordance with instructions provided by the one or more processors.

Also in an exemplary embodiment, the step of utilizing the updated map database includes automatically controlling steering of the vehicle, the one or more other vehicles, or both, in accordance with the instructions provided by the one or more processors, in order to avoid the one or more conditions of the roadway.

Also in an exemplary embodiment, the step of utilizing the updated map database includes automatically controlling a suspension system of the vehicle, the one or more other vehicles, or both, in accordance with the instructions provided by the one or more processors, in order to mitigate effects from the one or more conditions of the roadway.

Also in an exemplary embodiment, the step of obtaining the sensor data includes obtaining the sensor data pertaining to lateral control by the human of the vehicle along the roadway, from the one or more sensors of the vehicle while the vehicle is operated by the human; and the step of identifying the one or more conditions includes identifying the one or more conditions of the roadway on which the vehicle is travelling, based on the analyzing of the sensor data pertaining to the lateral control by the human of the vehicle along the roadway.

Also in an exemplary embodiment, the sensor data pertains to a position of the vehicle inside a lane of the roadway; the step of analyzing the sensor data includes determining, via the one or more processors, whether a difference between the position of the vehicle and a center of the lane is greater than a predetermined threshold; and the step of identifying the one or more conditions includes identifying the one or more conditions of the roadway based on whether the difference is greater than the predetermined threshold.

Also in an exemplary embodiment, the sensor data pertains to an angular position of a steering wheel of the vehicle; the step of analyzing the sensor data includes determining, via the one or more processors, whether a difference between the angular position of the steering wheel and a default angular position of the steering wheel is greater than a predetermined threshold; and the step of identifying the one or more conditions includes identifying the one or more conditions of the roadway based on whether the difference is greater than the predetermined threshold.

Also in an exemplary embodiment, the sensor data pertains to an angular acceleration of a steering wheel of the vehicle; the step of analyzing the sensor data includes determining, via the one or more processors, whether a difference between the angular acceleration of the steering wheel and a default angular acceleration of the steering wheel is greater than a predetermined threshold; and the step of identifying the one or more conditions includes identifying the one or more conditions of the roadway based on whether the difference is greater than the predetermined threshold.

Also in an exemplary embodiment, the sensor data pertains to a position of one or more shocks of a suspension system of the vehicle; the step of analyzing the sensor data includes determining, via the one or more processors, whether: a difference between the position of the one or more shocks and a default position of the one or more shocks is greater than a first predetermined threshold; and the difference between the position of the one or more shocks and the default position of the one or more shocks is less than a second predetermined threshold; and the step of identifying the one or more conditions includes identifying the one or more conditions of the roadway based on whether: the difference is greater than the first predetermined threshold; and the difference is less than the second predetermined threshold.

Also in an exemplary embodiment, the method further includes classifying, via the one or more processors, the one or more conditions as including: a pothole of the roadway, when the difference is greater than the first predetermined threshold; and a bump of the roadway, when the difference is less than the second predetermined threshold.

In another exemplary embodiments, a system is provided that includes one or more sensors configured to obtain sensor data pertaining to operation of a vehicle along a roadway by a human; and one or more processors that are coupled to the one or more sensors and that are configured to at least facilitate: analyzing the sensor data as to one or more threshold values pertaining to the operation of the vehicle; and identifying one or more conditions of the roadway, based on the analyzing of the sensor data.

Also in an exemplary embodiment, the system further includes a computer memory configured to store a map database for the roadway; wherein the one or more processors are further configured to at least facilitate: updating the map database, generating an updated map database in the computer memory, based on the identifying of the one or more conditions; and utilizing the updated map database for subsequent autonomous control of the vehicle, one or more other vehicles, or both.

Also in an exemplary embodiment, the one or more processors are further configured to at least facilitate automatically controlling steering of the vehicle, the one or more other vehicles, or both, in accordance with instructions provided by the one or more processors, in order to avoid the one or more conditions of the roadway.

Also in an exemplary embodiment, the one or more processors are further configured to at least facilitate automatically controlling a suspension system of the vehicle, the one or more other vehicles, or both, in accordance with instructions provided by the one or more processors, in order to mitigate effects from the one or more conditions of the roadway.

Also in an exemplary embodiment, the one or more sensors are configured to obtain the sensor data pertaining to a position of the vehicle inside a lane of the roadway; and the one or more processors are further configured to at least facilitate: determining whether a difference between the position of the vehicle and a center of the lane is greater than a predetermined threshold; and identifying the one or more conditions of the roadway based on whether the difference is greater than the predetermined threshold.

Also in an exemplary embodiment, the one or more sensors are configured to obtain the sensor data pertaining to an angular position of a steering wheel of the vehicle; and the one or more processors are further configured to at least facilitate: determining whether a difference between the angular position of the steering wheel and a default angular position of the steering wheel is greater than a predetermined threshold; and identifying the one or more conditions of the roadway based on whether the difference is greater than the predetermined threshold.

Also in an exemplary embodiment, the one or more sensors are configured to obtain the sensor data pertaining to an angular acceleration of a steering wheel of the vehicle; and the one or more processors are further configured to at least facilitate: determining whether a difference between the angular acceleration of the steering wheel and a default angular acceleration of the steering wheel is greater than a predetermined threshold; and identifying the one or more conditions of the roadway based on whether the difference is greater than the predetermined threshold.

In another exemplary embodiment, the sensor data pertains to a position of one or more shocks of a suspension system of the vehicle; and the one or more processors are further configured to at least facilitate determining, via the one or more processors, whether: a difference between the position of the one or more shocks and a default position of the one or more shocks is greater than a first predetermined threshold; and the difference between the position of the one or more shocks and the default position of the one or more shocks is less than a second predetermined threshold; and classifying the one or more conditions as including: a pothole of the roadway, when the difference is greater than the first predetermined threshold; and a bump of the roadway, when the difference is less than the second predetermined threshold.

In another exemplary embodiment, a vehicle is provided that includes a body; a drive system configured to generate movement of the body; one or more sensors disposed on or within the body and configured to obtain sensor data pertaining to operation of the vehicle along a roadway by a human; and one or more processors disposed within the body and coupled to the one or more sensors, the one or more processors configured to at least facilitate: analyzing the sensor data as to one or more threshold values pertaining to the operation of the vehicle; and identifying one or more conditions of the roadway, based on the analyzing of the sensor data.

Also in an exemplary embodiment, the vehicle further includes a computer memory configured to store a map database for the roadway; wherein the one or more processors are further configured to at least facilitate: updating the map database, generating an updated map database in the computer memory, based on the identifying of the one or more conditions; and utilizing the updated map database for subsequent autonomous control of the vehicle, one or more other vehicles, or both.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
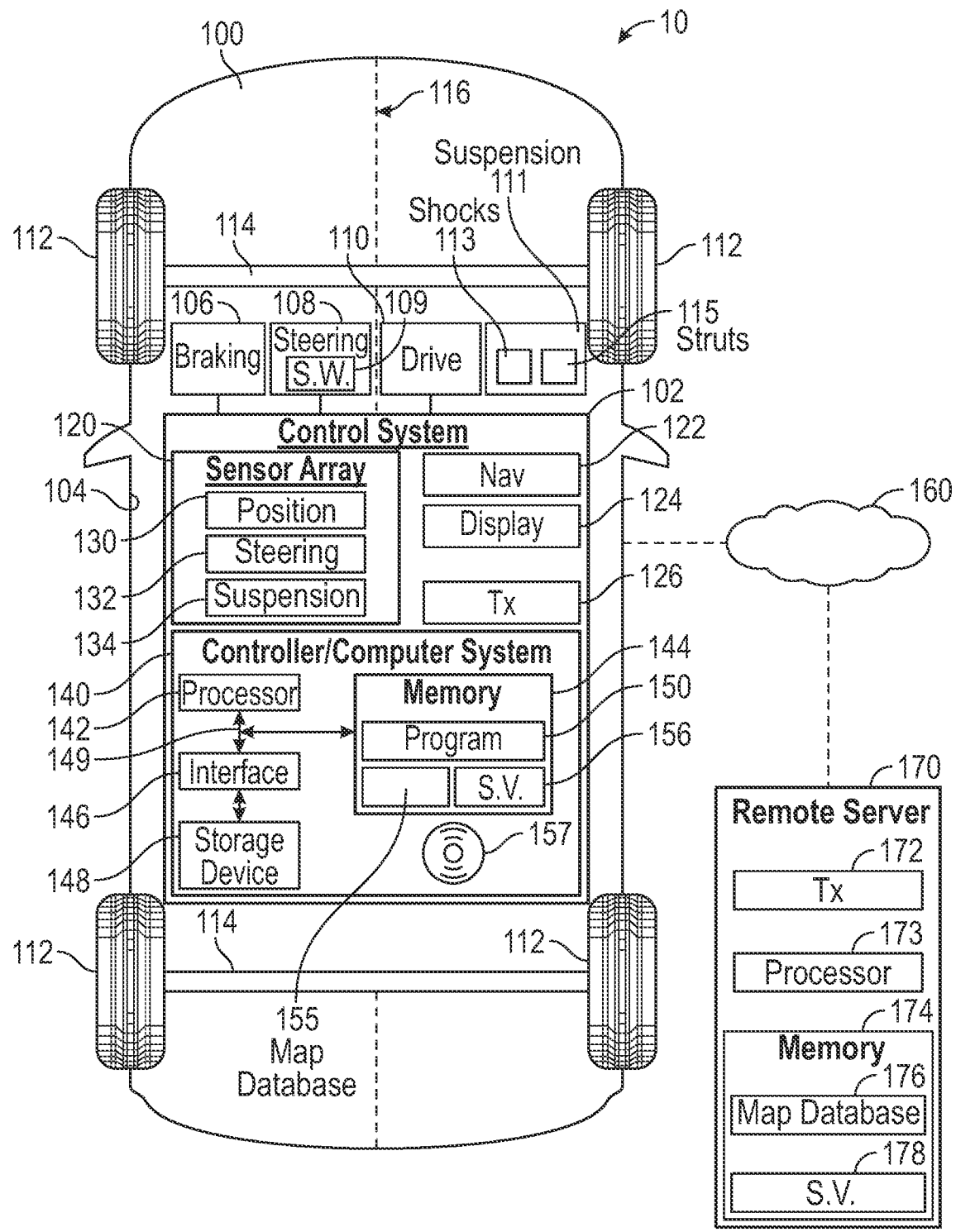
FIG. 1 is a functional block diagram of a system including a vehicle and a remote server, and including a control system of the vehicle that is used for classifying potholes and other road conditions based on human driven telemetry and for utilizing the results in automated driving for vehicles, in accordance with exemplary embodiments.

FIG. 1 illustrates a system 10. In various embodiments, and as described below; the system 10 includes one or more vehicles 100 (including one or more control systems 102) along with one or more remote servers 170 and communications networks 160. Also in various embodiments, the system 10 is configured for classifying potholes and other road conditions based on human driven telemetry (including a human's lateral control of the vehicle 100) and for utilizing the results in automated driving for vehicles, for example as described in greater detail below as well as the process 200 depicted in FIG. 2.

Figure 2:
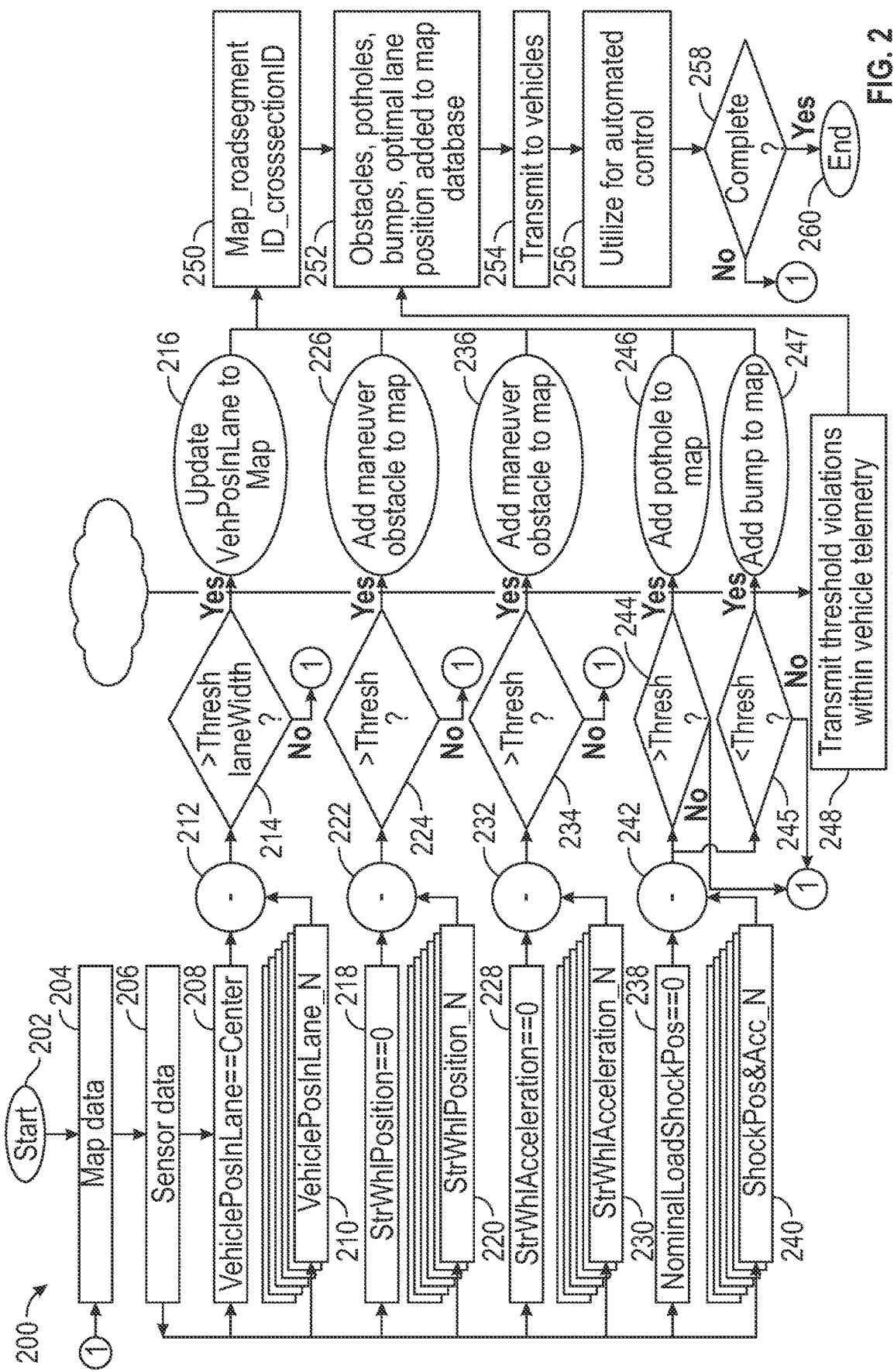
FIG. 2 is a flowchart of a process for classifying potholes and other road conditions based on human driven telemetry and for utilizing the results in automated driving for vehicles, and that can be implemented in connection with the system of FIG. 1, including the vehicle, remote server, and control system of the vehicle, among other components, in accordance with exemplary embodiments.

In various embodiments, the vehicle 100 represents one of a number of different vehicles 100 that operate on roads or other paths (collectively referred to as "roadways" herein). While a single vehicle 100 is depicted in FIG. 1, it will be appreciated that the system 10 may include any number of vehicles 100 that, working together and with the remote server 170, collectively perform the process 200 that is depicted in FIG. 2 and described further below in connection therewith. In addition, while the singular term "vehicle" may be used at times, it will be appreciated that this refers to any number of different vehicles (e.g., in a fleet or otherwise used together in the system 10 and in performing the process 200 of FIG. 2).

In various embodiments, each vehicle 100 comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

In certain embodiments, some of the vehicles 100 (in a fleet) may be operated in whole or in part by a human drivers, whereas other of the vehicles 100 may comprise an autonomous or semi-autonomous vehicle, for example in which vehicle control (including acceleration, deceleration, braking, and/or steering) is automatically planned and executed by the control system 102, in whole or in part. In addition, certain vehicles 100 may be operated by a human at certain times and via automated control at other times, in certain embodiments. As described in greater detail below with reference to both FIG. 1 as well as FIG. 2, in various embodiments, the system 10 of FIG. 1 (and the process 200 of FIG. 2) utilizes telemetry for human driving of one or more of the vehicles 100 in order to classify potholes and other road conditions, including for implementation in automated driving for these vehicles 100 and/or for other vehicles 100 with automated driving functionality.

In the depicted embodiment, the vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112, for example via axles 114. The drive system 110 preferably comprises a propulsion system. In certain exemplary embodiments, the drive system 110 comprises an internal combustion engine and/or an electric motor/generator, coupled with a transmission thereof. In certain embodiments, the drive system 110 may vary, and/or two or more drive systems 110 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As noted above, in certain embodiments, the vehicle 100 includes one or more functions that may be controlled automatically via the control system 102, for example in certain circumstances. In certain embodiments, some of the vehicles 100 may be operated by human drivers, whereas other of the vehicles 100 may be autonomous vehicles, such as a semi-autonomous vehicle or a fully autonomous vehicle, for automated control of the drive system 110 and/or other vehicle components. However, this may vary in other embodiments, for example in which a human driver may control the drive system 110.

As depicted in FIG. 1, the vehicle 100 also includes a braking system 106 and a steering system 108 in various embodiments. In exemplary embodiments, the braking system 106 controls braking of the vehicle 100 using braking components that are controlled via inputs provided by a driver (e.g., via a braking pedal in certain embodiments) and/or automatically via the control system 102. Also in exemplary embodiments, the steering system 108 controls steering of the vehicle 100 via steering components (e.g., a steering wheel 109 that is part of a steering column coupled to the axles 114 and/or the wheels 112) that are controlled via inputs provided by a driver (e.g., via the steering wheel 109 in certain embodiments) and/or automatically via the control system 102.

Also as depicted in FIG. 1, in various embodiments the vehicle 100 further includes a suspension system 111 that provides protection and shock-absorption for the vehicle 100. In various embodiments, the suspension system 111 includes one or more shocks 113 (e.g., that provide damping by controlling spring and suspension movement) and struts 115 (e.g., that provide damping as well as structural support for the suspension system 111). In certain embodiments, the suspension system 111 is controlled between different states or positions (e.g., via different positions of the shocks 113) by the control system 102, for example when a pothole or other road condition is expected or detected.

In the embodiment depicted in FIG. 1, in certain embodiments, the control system 102 is coupled to the braking system 106, the steering system 108, the drive system 110, and the suspension system 111. In various embodiments, the control system 102 at least facilitates obtaining telemetry for human driving, and using this telemetry for classifying potholes and other road conditions and ultimately for using the results for future automated driving for the present vehicle 100 and/or for one or more other vehicles 100. In addition, in certain embodiments in which the vehicle 100 is an autonomous or semi-autonomous vehicle, the control system 102 also provides in certain circumstances control over automated features of the vehicle 100 (including automated operation of the braking system 106, the steering system 108, the drive system 110, and/or the suspension system 111), including when a pothole or other road condition is detected or expected based on the previous human driven telemetry.

As depicted in FIG. 1, in various embodiments, the control system 102 includes a sensor array 120, a navigation system 122, a display 124, a transceiver 126, and a controller 140.

In various embodiments, the sensor array 120 obtains sensor data for use by the controller 140 in performing the human driven telemetry that is used for classifying potholes and other road conditions for the vehicle 100. In various embodiments, the sensor array 120 includes one or more position sensors 130, steering sensors 132, and suspension sensors 134, among other possible sensors.

In various embodiments, the position sensors 130 detect a position of the vehicle 100 within a lane of a roadway or path in which the vehicle 100 is travelling. For example, in various embodiments, the position may include whether the vehicle 100 is in a center portion, left portion, or right portion of the lane. In certain embodiments, the position sensors 130 may be part of one or more satellite-based systems for determining the position of the vehicle 100, such as a global positioning system (GPS) that may be part of and/or associated with the navigation system 122. In certain other embodiments, one or more other different types of position sensors 130 may be utilized.

Also in various embodiments, the steering sensors 132 measure one or more steering angles for the vehicle 100. In certain embodiments, the steering sensors 132 are part of or coupled to the steering wheel 109, and measure a steering angle of the steering wheel 109. In various embodiments, such values are collected over time, such as to generate a steering angle as well as a steering acceleration for the vehicle 100 based on the measurements of the steering wheel angle.

In addition, in various embodiments, the suspension sensors 134 obtain sensor data as to the suspension system 111 of the vehicle 100. In various embodiments, the suspension sensors 134 are part of or coupled to the suspension system 111, and obtain the sensor data as to a position or state of the suspension systems 111 (including, for example, one or more positions or states of the shocks 113 and/or struts 115).

In various embodiments, the navigation system 122 (also referred to herein as a "location system") is configured to obtain and/or generate data as to a position and/or location in which the vehicle 100 is located and/or is travelling, and including map information and/or other information as to the location (e.g., as to the roadway or path on which the vehicle 100 is travelling). In certain embodiments, the navigation system 122 comprises and/or or is coupled to a satellite-based network and/or system, such as a global positioning system (GPS) and/or other satellite-based system.

In certain embodiments, the vehicle 100 also includes a transceiver 126. In various embodiments, the transceiver 126 receives information regarding the location in which the vehicle 100 is being operated and/or about other information as to the location (e.g., as to the roadway or path on which the vehicle 100 is travelling), and also transmits information (e.g., as to the telemetry of human driving along the roadway, including the position, steering angle, and steering acceleration) to the remote server 170, for example as described in greater detail further below.

In certain embodiments, the display 124 provides information and alerts for a driver of the vehicle 100. For example, in certain embodiments, the display 124 provides notifications for the driver when the driver's attention may be required, such as when it is determined or expected that the vehicle 100 is approaching a pothole or other condition of the roadway. In certain embodiments, the display 124 may provide visual alerts (e.g., such as via a visual display screen), audio alerts (e.g., such as via one or more speakers), and/or haptic alerts (e.g., via vibration of a seat of the vehicle 100), among other possible alerts.

In various embodiments, the controller 140 is coupled to the sensor array 120, as well as to the braking system 106, the steering system 108, the drive system 110, and the suspension system 111. In various embodiments, the controller 140 is also coupled to the navigation system 122, the display 124, and the transceiver 126.

In various embodiments, the controller 140 comprises a computer system, and includes a processor 142, a memory 144, an interface 146, a storage device 148, and a computer bus 149. In various embodiments, the controller (or computer system) 140 obtains sensor data from the sensor array 120, and in certain embodiments additional data via the navigation system 122 and/or the transceiver 126. In various embodiments, the controller 140 utilizes this data to perform telemetry as to human driving of the vehicle 100, including the human driver's reaction to a pothole or other condition of the roadway (e.g., the human driver's movement of the vehicle 100 to a different part of the lane, and/or the human driver's steering of the vehicle 100 around the pothole or other condition of the roadway, and/or the state or position of the suspension system 111, and so on). Also in certain embodiments, the controller 140 also utilizes the results from previous telemetry (e.g., on the present vehicle 100 and/or one or more other vehicles 100) in order to provide autonomous driving instructions (e.g., for automated control of the braking system 106, steering system 108, drive system 110, and/or suspension system 111). In various embodiments, the controller 140 provides these and other functions in accordance with the steps of the processes and implementations depicted in FIG. 2 and as described further below in connection therewith.

In various embodiments, the controller 140 (and, in certain embodiments, the control system 102 itself) is disposed within the body 104 of the vehicle 100. In one embodiment, the control system 102 is mounted on the chassis 116. In certain embodiments, the controller 140 and/or control system 102 and/or one or more components thereof may be disposed outside the body 104, for example on a remote server, in the cloud, or other device where image processing is performed remotely. In certain embodiments, the controller 140 of the vehicle 100 also performs functions in concert with the remote server 170, described further below.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 149. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 150 contained within the memory 144 and, as such, controls the general operation of the controller 140 and the computer system of the controller 140, generally in executing the processes described herein, such as the processes and implementations depicted in FIG. 2 and as described further below in connection therewith.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 150 along with a map database 155 (e.g., that includes maps with roadways, and classifications of potholes and other conditions along the roadways) and other stored values 156 (e.g., including threshold values for the determinations of the processes and implementations depicted in FIG. 2 and as described further below in connection therewith in accordance with exemplary embodiments).

The bus 149 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120 and/or the navigation system 122. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 150 that executes one or more embodiments of the processes and implementations of FIG. 2 and as described further below in connection therewith. In another exemplary embodiment, the program product may be directly stored in and/or otherwise accessed by the memory 144 and/or a secondary storage device (e.g., disk 157), such as that referenced below.

The bus 149 can be any suitable physical or logical means of connecting computer systems and components. This includes, but is not limited to, direct hard-wired connections, fiber optics, infrared and wireless bus technologies. During operation, the program 150 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

With continued reference to FIG. 1, in various embodiments the vehicle 100 and the remote server 170 communicate via one or more communications networks 160. In various embodiments, the communications networks 160 may include one or more wireless communications networks (e.g., satellite-based, cellular, and/or any number of other different types of wireless communications networks).

Also in various embodiments, the remote server 170 is disposed remote from, or a significant physical distance from, each of the vehicles 100 (e.g., in a fleet). In various embodiments, as depicted in FIG. 1, the remote server 170 includes one or more transceivers 172, processors 173, and computer memory 174 storing a map database 176 along with stored values 178. In various embodiments, the transceiver 172 is utilized to communicate with the vehicle 100, including for receiving human driven telemetry from the vehicle, and subsequently for transmitting updated map database 176 information to the vehicle 100 (and to other vehicles) for implementation in future autonomous operation of such vehicles 100. As depicted in FIG. 1, the transceiver 172, processor 173, memory 174, map database 176, and stored values 178 are similar or identical to the corresponding features of the vehicle 100 (e.g., as to the transceiver 126, processor 142, memory 144, map database 155, and stored values 156 thereof).

FIG. 2 is a flowchart of a process 200 for classifying potholes and other road conditions based on human driven telemetry (including monitoring the human's lateral control of the vehicle) and for utilizing the results in automated driving for vehicles, in accordance with exemplary embodiments. In various embodiments, the process 200 can be implemented in connection with the system 10 of FIG. 1, including the vehicle 100, remote server 170, and control system 102 of the vehicle 100, among other components thereof, in accordance with exemplary embodiments.

As depicted in FIG. 2, the process 200 begins at step 202. In various embodiments, the process 200 begins when the vehicle 100 of FIG. 1 is started when the vehicle 100 begins operating in a current drive cycle, and/or in certain embodiments when a driver enters, approaches, and/or turns on the vehicle 100. In various embodiments, the steps depicted in FIG. 2 are performed, preferably continuously, throughout the duration of the process 200.

In various embodiments, map data is obtained (step 204). In various map data is obtained from the memory 144 of the vehicle 100 (e.g., as the map database 155 therein) and/or from the memory 174 of the remote server 170 (e.g., as the map database 176 therein). In various embodiments, the map data comprises information of a roadway or path on which the vehicle 100 is travelling (e.g., in conjunction with location or position obtained via the position sensors 130 and/or the navigation system 122 of FIG. 1), and including any detected potholes or other road conditions (e.g., as determined via prior iterations of the process 200 with the current vehicle 100 and/or other vehicles in various embodiments).

Also in various embodiments, sensor data is obtained (step 206). In various embodiments, sensor data is obtained from the sensor array 120 of FIG. 1. Specifically, in various embodiments, the sensor data includes, among other possible sensor data: vehicle position data as to a position or location of the vehicle 100, including with respect to a lane in which the vehicle 100 is travelling (e.g., as obtained via one or more position sensors 130 and/or the navigation system 122 of FIG. 1); vehicle steering data as to a steering angle of the vehicle 100 and changes thereto, such as respect to a steering wheel angle of the steering wheel 109 of FIG. 1. (e.g., as obtained via one or more steering sensors 132 of FIG. 1); and vehicle suspension data as to a state or position of the of the suspension system 111 of FIG. 1, such as respect to a loading or position of the shocks 113 of the suspension system 111 of FIG. 1 (e.g., as obtained via one or more suspension sensors 134 of FIG. 1).

In various embodiments, the vehicle position data, vehicle steering data, and vehicle suspension data are analyzed separately, as described in greater detail below.

In various embodiments, the vehicle position data of step 206 is analyzed in steps 208-214. Specifically, in various embodiments, a standard (or default) center vehicle position is identified in step 208 (e.g., corresponding to a position in a center, or middle, of the lane). Also in various embodiments, an actual vehicle position with respect to the lane is determined in step 210 based on the sensor data of step 206 (e.g., as to the whether the vehicle 100 is currently in the center of the lane, or whether the vehicle 100 is currently to the right or left of the center of the lane). In various embodiments, in step 212, a difference between the default center lane position and the current lane position is calculated, and a determination is made in step 214 as to whether this difference is greater than a predetermined threshold. In various embodiments, these calculations and determinations are made via one or more processors, such as the processor 142 and/or the processor 173 of FIG. 1. Also in one embodiment, the predetermined threshold of step 214 is equal to approximately 0.2 inch; however, this may vary in other embodiments.

In various embodiments, if it is determined in step 214 that the difference of step 212 is greater than the predetermined threshold of step 214, then the process proceeds to step 216, during which the map database is updated to include the updated vehicle position of step 210 with respect to the lane. In various, the map database 155 and/or map database 176 are updated accordingly via instructions provided by the processor 142 and/or processor 173 of FIG. 1. In various embodiments, the process 200 then proceeds to both step 248 (transmitting threshold violations) and step 250 (updated the map identification and cross section), described further below. Conversely, in various embodiments, if it is instead determined in step 214 that the difference of step 212 is less than or equal to the predetermined threshold of step 214, then the process returns to step 204, as additional map data is obtained.

In various embodiments, the vehicle steering data of step 206 is analyzed in steps 218-234. Specifically, in various embodiments: steering wheel position is analyzed in step 218-224, whereas steering wheel acceleration is analyzed in steps 228-234.

As noted above, in various embodiments steering wheel position is analyzed in steps 218-224. As used herein, in various embodiments, the steering wheel position comprises an angular position of the steering wheel. Specifically, in various embodiments, during step 218, a standard (or default) steering wheel position is identified (e.g., corresponding to a zero steering angle, or center angle, for the steering wheel 109 of FIG. 1). Also in various embodiments, an actual steering wheel position (e.g., corresponding to a current steering angle for the steering wheel 109) is determined in step 220 based on the sensor data of step 206. In various embodiments, in step 222, a difference between the default steering wheel position (e.g., angle) and the current steering wheel position (e.g., angle) is calculated, and a determination is made in step 224 as to whether this difference is greater than a predetermined threshold. In various embodiments, these calculations and determinations are made via one or more processors, such as the processor 142 and/or the processor 173 of FIG. 1. Also in one embodiment, the predetermined threshold of step 224 is equal to approximately five degrees; however, this may vary in other embodiments.

In various embodiments, if it is determined in step 224 that the difference of step 222 is greater than the predetermined threshold of step 224, then the process proceeds to step 226, during which the map database is updated to include a maneuver obstacle associated with the current lane and position. In various, the map database 155 and/or map database 176 are updated accordingly via instructions provided by the processor 142 and/or processor 173 of FIG. 1. In various embodiments, the process 200 then proceeds to both step 248 (transmitting threshold violations) and step 250 (updating the map identification and cross section), described further below. Conversely, in various embodiments, if it is instead determined in step 224 that the difference of step 222 is less than or equal to the predetermined threshold of step 224, then the process returns to step 204, as additional map data is obtained.

As noted above, in various embodiments steering wheel acceleration is analyzed in steps 228-234. As used herein, in various embodiments, the steering wheel acceleration comprises an angular acceleration of the steering wheel. Specifically, in various embodiments, during step 228, a standard (or default) rate of steering wheel acceleration is identified (e.g., corresponding to a zero steering angle acceleration for the steering wheel 109 of FIG. 1). Also in various embodiments, an actual rate of steering wheel acceleration (e.g., corresponding to a current rate of acceleration of steering angle for the steering wheel 109) is determined in step 230 based on the sensor data of step 206. In various embodiments, in step 232, a difference between the default rate of steering wheel acceleration (e.g., angular acceleration) and the current rate of steering wheel acceleration (e.g., angular acceleration) is calculated, and a determination is made in step 234 as to whether this difference is greater than a predetermined threshold. In various embodiments, these calculations and determinations are made via one or more processors, such as the processor 142 and/or the processor 173 of FIG. 1. Also in one embodiment, the predetermined threshold of step 234 is equal to approximately two times the rate of acceleration of gravity (2.0 G); however, this may vary in other embodiments.

In various embodiments, if it is determined in step 234 that the difference of step 232 is greater than the predetermined threshold of step 234, then the process proceeds to step 236, during which the map database is updated to include a maneuver obstacle associated with the current lane and position. In various, the map database 155 and/or map database 176 are updated accordingly via instructions provided by the processor 142 and/or processor 173 of FIG. 1. In various embodiments, the process 200 then proceeds to both step 248 (transmitting threshold violations) and step 250 (updating the map identification and cross section), described further below. Conversely, in various embodiments, if it is instead determined in step 234 that the difference of step 232 is less than or equal to the predetermined threshold of step 234, then the process returns to step 204, as additional map data is obtained.

In various embodiments vehicle suspension data is analyzed in steps 238-245. Specifically, in various embodiments, during step 238, a standard (or default) position of the suspension system 111 of FIG. 1 is identified (e.g., corresponding to a standard or default position of shocks 113 of the suspension system 111 consistent with a smooth driving surface). Also in various embodiments, an actual position of the suspension system (e.g., corresponding to a current position of shocks 111 of the suspension system 111) is determined in step 240 based on the sensor data of step 206. In various embodiments, in step 242, a difference between the default position of the suspension system 111 and the current position of the suspension system 111 is calculated, and determinations are made in steps 244 and 245 as to both: (A) whether the difference is greater than a first predetermined threshold (step 244), and (B) whether the difference is less than a second predetermined threshold (step 245). In various embodiments, these calculations and determinations are made via one or more processors, such as the processor 142 and/or the processor 173 of FIG. 1. Also in one embodiment, the first predetermined threshold of step 244 corresponds to a first threshold, whereas a shock position greater than this first threshold indicates a pothole in the roadway. Conversely, also in one embodiment, the second predetermined threshold of step 245 corresponds to a second threshold, whereas a shock position greater than this second threshold indicates a raised condition or bump in the roadway.

In various embodiments, if it is determined in step 244 that the difference of step 242 is greater than the first predetermined threshold of step 244, then the process proceeds to step 246, during which the map database is updated to include a pothole associated with the current lane and position. Also in various embodiments, if it is determined in step 245 that the difference of step 242 is less than the second predetermined threshold of step 245, then the process proceeds to step 247, during which the map database is updated to include a raised position or bump associated with the current lane and position. In various embodiments, the map database 155 and/or map database 176 are updated accordingly (when either step 246 or step 247 are performed) via instructions provided by the processor 142 and/or processor 173 of FIG. 1. In various embodiments, the process 200 then proceeds to both step 248 (transmitting threshold violations) and step 250 (updating the map identification and cross section), described further below. Conversely, in various embodiments, if it is instead determined in both (A) step 244 that the difference of step 242 is less than or equal to the first predetermined threshold of step 244; and (B) step 245 that the difference of step 242 is greater than or equal to the second predetermined threshold of step 245, then the process returns to step 204, as additional map data is obtained.

As alluded to above, in various embodiments steps 248 and 250 are performed when any of the conditions of steps 214, 224, 234, 244, and/or 245 are satisfied (i.e., with a "yes" result). In various embodiments, during step 248, the various results of steps 214, 224, 234, 244, and/or 245 (whichever have been satisfied with "yes" results) are transmitted from the vehicle 100 to the remote server 170 (e.g. via the respective transceivers 126, 172 thereof) for processing.

Also in various embodiments, during step 250, the map database is updated with respect to the road segment identification and the cross section (e.g., orthogonal to the road surface) identification for a current road segment of the lane and road in which the vehicle 100 is travelling, in order to incorporate all of the information of the steps 214, 224, 234, 244, and/or 245 that were satisfied.

In various embodiments, the updated information of step 250 is utilized to update the map database (step 252). In various embodiments, the map database 176 of the remote server is updated via the processor 173 in order to incorporate all of the additional information of step 248 and step 250, including an identification of threshold violations and an identification of and classification of potholes, bumps, optimal lane position (e.g., center of lane, right of center, or left of center), and/or any other detected conditions for the map database. In certain embodiments, the map database 155 of the vehicle(s) 100 of FIG. 1 may also similarly be updated, for example via the processor 142 and/or processor 173 of FIG. 1.

Also in various embodiments, the updated information (including the updated map database) is transmitted to the vehicles (step 254). In various embodiments, this updated information (including the updated map database) is transmitted from the remote server 170 to various vehicles 100 (e.g., in a fleet of vehicles) via respective transceivers 172, 126 of FIG. 1.

Also in various embodiments, during step 256, the updated information (including the updated map database) is utilized in each vehicle 100 (e.g., in the fleet). For example, in various embodiments, the updated information is stored in each vehicle 100 as an updated map database 155 of the memory 144 of the vehicle 100, and the updated map database 155 is utilized for automated control of one or more (and, in certain embodiments, all) of the braking system 106, steering system 108, drive system 110, and suspension system 111 of the vehicle 100. Specifically, in various embodiments, the processor 142 of each vehicle 100 utilizes the updated map database 155 in controlling movement and operation of the vehicle 100 to avoid or mitigate the effects of potholes, bumps, or other road conditions associated with the current location of the position. For example, in certain embodiments, the processor 142 utilizes the updated map database 155 to: (A) steer to the right or to the left to avoid the potholes, bumps, or other road conditions; (B) adjust vehicle braking, speed, or acceleration as appropriate in view of the potholes, bumps, or other road conditions; and/or (C) adjust a position or state of the suspension (e.g., via adjustment of shocks 113 of the suspension system 111) as appropriate to mitigate the effects on the vehicle 100 of the potholes, bumps, or other road conditions. It will be appreciated that in various embodiments the type and/or magnitude of such vehicle control actions may vary, for example, based on the type of vehicle (e.g., the adjustment to the suspension system 111 may be different for a sports car versus a truck, and so on). In addition, in certain embodiments, related notifications as to the identified road conditions and/or automated actions (or, in certain embodiments, recommended actions) may also be provided, for example via the display 124 of FIG. 1 in accordance with instructions provided by the processor 142 of FIG. 1.

In various embodiments, a determination is made as to whether the process 200 is complete (step 258). In various embodiments, this may comprise a determination via the processor 142 of FIG. 1 as to a whether a current drive or cycle is complete for the vehicle 100. In various embodiments, when it is determined in step 258 that the process 200 is not complete, the process 200 returns to step 204, as updated map data is obtained in a new iteration. Conversely, in various embodiments, when it is instead determined in step 258 that the process 200 is complete, the process 200 terminates at step 260.

Accordingly, methods, systems, and vehicles are provided for identifying and classifying potholes and other conditions of a roadway in which a vehicle is travelling. In various embodiments, the potholes and other road conditions are identified and classified based on human driven telemetry when a human is driving the vehicle 100. For example, in various embodiments, the lateral control of the vehicle when driven by a human (e.g., the human's steering around obstacles and/or positioning the vehicle to avoid potholes, and any associated adjustments to the position of the shocks of the suspension system, and so on) is analyzed for identifying and classifying the potholes and other road conditions. Also in various embodiments, the identification and classification of the potholes and other conditions of the roadway are utilized for the present vehicle and/or for other vehicles (e.g., in a fleet of vehicles) for controlling automated driving of such vehicles, for example to avoid or mitigate the effects of such potholes or other conditions of the roadway in which the vehicle is travelling.

It will be appreciated that the systems, vehicles, and methods may vary from those depicted in the Figures and described herein. For example, the system 10 of FIG. 1, including vehicle 100 of FIG. 1 and the control system 102 thereof, and further including the communications network 160 and the remote server 170 thereof, and/or components thereof, may differ from that depicted in FIG. 1. It will similarly be appreciated that the steps of the processes and implementations of FIG. 2 may differ from those depicted in the Figures, and/or that various steps may occur concurrently and/or in a different order than that depicted in the Figures.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
   obtaining sensor data pertaining to operation of a vehicle along a roadway by a human, from one or more sensors of the vehicle, the sensor data pertaining to a position of one or more shocks of a suspension system of the vehicle;
   analyzing the sensor data, via one or more processors, as to one or more threshold values pertaining to the operation of the vehicle, the step of analyzing the sensor data comprises determining, via the one or more processors, whether:
      a difference between the position of the one or more shocks and a default position of the one or more shocks is greater than a first predetermined threshold; and
      the difference between the position of the one or more shocks and the default position of the one or more shocks is less than a second predetermined threshold;
   identifying one or more conditions of the roadway, via the one or more processors, based on the analyzing of the sensor data, the step of identifying the one or more conditions comprises identifying the one or more conditions of the roadway based on whether:
      the difference is greater than the first predetermined threshold; and
      the difference is less than the second predetermined threshold;
   classifying, via the one or more processors, the one or more conditions as comprising:
      a pothole of the roadway, when the difference is greater than the first predetermined threshold; and
      a bump of the roadway, when the difference is less than the second predetermined threshold;
   identifying, via the processor using the sensor, a current lane position of the vehicle relative to a center of a lane in which the vehicle is travelling;
   automatically moving the vehicle, in accordance with instructions provided by the one or more processors, in order to avoid the pothole, the bump, or both; and
   updating a map database of the roadway stored in a computer memory, in accordance with instructions provided by the one or more processors, to include the pothole, the bump, or both, in addition to an optimal lane position of the lane of the roadway for maneuvering around the pothole, the bump, or both.

2. The method of claim 1, further comprising:
   utilizing the updated map database for subsequent autonomous control of the vehicle, one or more other vehicles, or both, in accordance with instructions provided by the one or more processors, including for using the optimal position of the lane of the roadway for maneuvering around the pothole, the bump, or both.

3. The method of claim 2, wherein the step of utilizing the updated map database comprises automatically controlling steering of the vehicle, the one or more other vehicles, or both, in accordance with the instructions provided by the one or more processors, in order to avoid the one or more conditions of the roadway, including for using the optimal position of the lane of the roadway for maneuvering around the pothole, the bump, or both.

4. The method of claim 2, wherein the step of utilizing the updated map database comprises automatically controlling the suspension system of the vehicle, the one or more other vehicles, or both, in accordance with the instructions provided by the one or more processors, in order to mitigate effects from the one or more conditions of the roadway, including for using the optimal position of the lane of the roadway for maneuvering around the pothole, the bump, or both.

5. The method of claim 1, wherein:
   the step of obtaining the sensor data further comprises obtaining the sensor data pertaining to lateral control by the human of the vehicle along the roadway, from the one or more sensors of the vehicle while the vehicle is operated by the human; and
   the step of identifying the one or more conditions further comprises identifying the one or more conditions of the roadway on which the vehicle is travelling, based on the analyzing of the sensor data pertaining to the lateral control by the human of the vehicle along the roadway.

6. The method of claim 1, wherein:
   the sensor data further pertains to the current lane position of the vehicle inside the lane of the roadway;
   the step of analyzing the sensor data further comprises determining, via the one or more processors, whether a difference between the current lane position of the vehicle and the center of the lane is greater than a predetermined threshold; and
   the step of identifying the one or more conditions further comprises identifying the one or more conditions of the roadway based on whether the difference is greater than the predetermined threshold.

7. The method of claim 6, wherein the predetermined is equal to approximately 0.2 inch.

8. The method of claim 1, wherein:
   the sensor data further pertains to an angular position of a steering wheel of the vehicle;
   the step of analyzing the sensor data further comprises determining, via the one or more processors, whether a difference between the angular position of the steering wheel and a default angular position of the steering wheel is greater than a predetermined threshold; and the step of identifying the one or more conditions further comprises identifying the one or more conditions of the roadway based on whether the difference is greater than the predetermined threshold.

9. The method of claim 1, wherein:

the sensor data further pertains to an angular acceleration of a steering wheel of the vehicle;

the step of analyzing the sensor data further comprises determining, via the one or more processors, whether a difference between the angular acceleration of the steering wheel and a default angular acceleration of the steering wheel is greater than a predetermined threshold; and the step of identifying the one or more conditions further comprises identifying the one or more conditions of the roadway based on whether the difference is greater than the predetermined threshold.

10. The method of claim 1, wherein the step of updating the map database comprises updating the map database of the roadway stored in the computer memory, in accordance with instructions provided by the one or more processors, to include both a plurality of potholes and a plurality of bumps, in addition to an optimal lane position of the lane of the roadway for maneuvering around the potholes and the bumps based on the identifying and the classification of both the plurality of potholes and the plurality of bumps on the roadway via the one or more processors using the sensor data.

11. The method of claim 1, wherein the updated computer database is used via the one or more processors of a fleet vehicles, including for automatically positioning each vehicle of the fleet in the optimal lane position of the lane of the roadway for maneuvering around the potholes and the bumps based on the identifying and the classification of both the plurality of potholes and the plurality of bumps on the roadway via the one or more processors using the sensor data.

12. A system comprising:

one or more sensors configured to obtain sensor data pertaining to operation of a vehicle along a roadway by a human, the sensor data pertaining to a position of one or more shocks of a suspension system of the vehicle;

a computer memory configured to store a map database for the roadway; and one or more processors that are coupled to the one or more sensors and that are configured to at least facilitate:

analyzing the sensor data as to one or more threshold values pertaining to the operation of the vehicle, including by determining:

a difference between the position of the one or more shocks and a default position of the one or more shocks is greater than a first predetermined threshold; and the difference between the position of the one or more shocks and the default position of the one or more shocks is less than a second predetermined threshold;

identifying one or more conditions of the roadway, based on the analyzing of the sensor data, including based on whether:

the difference is greater than the first predetermined threshold; and the difference is less than the second predetermined threshold;

classifying, via the one or more processors, the one or more conditions as comprising:

a pothole of the roadway, when the difference is greater than the first predetermined threshold; and a bump of the roadway, when the difference is less than the second predetermined threshold;

identifying, via the processor using the sensor, a current lane position of the vehicle relative to a center of a lane in which the vehicle is travelling;

automatically moving the vehicle, in accordance with instructions provided by the one or more processors, in order to avoid the pothole, the bump, or both; and updating the map database of the roadway stored in the computer memory, in accordance with instructions provided by the one or more processors, to include the pothole, the bump, or both, in addition to an optimal lane position of the lane of the roadway for maneuvering around the pothole, the bump, or both.

13. The system of claim 12, wherein the one or more processors are further configured to at least facilitate:

utilizing the updated map database for subsequent autonomous control of the vehicle, one or more other vehicles, or both.

14. The system of claim 13, wherein the one or more processors are further configured to at least facilitate automatically controlling steering of the vehicle, the one or more other vehicles, or both, in accordance with instructions provided by the one or more processors, in order to avoid the one or more conditions of the roadway, including for using the optimal position of the lane of the roadway for maneuvering around the pothole, the bump, or both.

15. The system of claim 13, wherein the one or more processors are further configured to at least facilitate automatically controlling the suspension system of the vehicle, the one or more other vehicles, or both, in accordance with instructions provided by the one or more processors, in order to mitigate effects from the one or more conditions of the roadway, including for using the optimal position of the lane of the roadway for maneuvering around the pothole, the bump, or both.

16. The system of claim 12, wherein:

the one or more sensors are further configured to obtain the sensor data pertaining to the current lane position of the vehicle inside a lane of the roadway; and the one or more processors are further configured to at least facilitate:

determining whether a difference between the current lane position of the vehicle and the center of the lane is greater than a predetermined threshold; and identifying the one or more conditions of the roadway based on whether the difference is greater than the predetermined threshold.

17. The system of claim 12, wherein:

the one or more sensors are further configured to obtain the sensor data pertaining to an angular position of a steering wheel of the vehicle; and the one or more processors are further configured to at least facilitate:

determining whether a difference between the angular position of the steering wheel and a default angular position of the steering wheel is greater than a predetermined threshold; and identifying the one or more conditions of the roadway based on whether the difference is greater than the predetermined threshold.

18. The system of claim 12, wherein:
the one or more sensors are further configured to obtain the sensor data pertaining to an angular acceleration of a steering wheel of the vehicle; and
the one or more processors are further configured to at least facilitate:
  determining whether a difference between the angular acceleration of the steering wheel and a default angular acceleration of the steering wheel is greater than a predetermined threshold; and
  identifying the one or more conditions of the roadway based on whether the difference is greater than the predetermined threshold.

19. A vehicle comprising:
a body;
a drive system configured to generate movement of the body;
one or more sensors disposed on or within the body and configured to obtain sensor data pertaining to operation of the vehicle along a roadway by a human, the sensor data pertaining to a position of one or more shocks of a suspension system of the vehicle;
a computer memory configured to store a map database for the roadway; and
one or more processors disposed within the body and coupled to the one or more sensors, the one or more processors configured to at least facilitate:
  analyzing the sensor data as to one or more threshold values pertaining to the operation of the vehicle, including by determining:
    a difference between the position of the one or more shocks and a default position of the one or more shocks is greater than a first predetermined threshold; and
    the difference between the position of the one or more shocks and the default position of the one or more shocks is less than a second predetermined threshold;
  identifying one or more conditions of the roadway, based on the analyzing of the sensor data, including based on whether:
    the difference is greater than the first predetermined threshold; and
    the difference is less than the second predetermined threshold;
  classifying, via the one or more processors, the one or more conditions as comprising:
    a pothole of the roadway, when the difference is greater than the first predetermined threshold; and
    a bump of the roadway, when the difference is less than the second predetermined threshold;
  identifying, via the processor using the sensor, a current lane position of the vehicle relative to a center of a lane in which the vehicle is travelling;
  automatically moving the vehicle, in accordance with instructions provided by the one or more processors, in order to avoid the pothole, the bump, or both; and
  updating the map database of the roadway stored in the computer memory, in accordance with instructions provided by the one or more processors, to include the pothole, the bump, or both, in addition to an optimal lane position of the lane of the roadway for maneuvering around the pothole, the bump, or both.

20. The vehicle of claim 19,
wherein the one or more processors are further configured to at least facilitate:
  utilizing the updated map database for subsequent autonomous control of the vehicle, one or more other vehicles, or both.

* * * * *